United States Patent
Marzinke

(10) Patent No.: US 11,364,776 B2
(45) Date of Patent: Jun. 21, 2022

(54) CABLE DRIVE SYSTEM FOR A PROTECTION DEVICE FOR A VEHICLE INTERIOR

(71) Applicant: Timo Marzinke, Ostfildern (DE)

(72) Inventor: Timo Marzinke, Ostfildern (DE)

(73) Assignee: BOS GMBH & CO. KG, Ostfildern (DE)

(*) Notice: Subject to any disclaimer, the term of this patent is extended or adjusted under 35 U.S.C. 154(b) by 188 days.

(21) Appl. No.: 16/985,515

(22) Filed: Aug. 5, 2020

(65) Prior Publication Data
US 2021/0046807 A1    Feb. 18, 2021

(30) Foreign Application Priority Data
Aug. 13, 2019 (DE) .......................... 102019212097.0

(51) Int. Cl.
*B60J 1/20* (2006.01)
*B66D 1/74* (2006.01)

(52) U.S. Cl.
CPC .......... *B60J 1/2025* (2013.01); *B66D 1/7447* (2013.01); *B66D 1/7489* (2013.01)

(58) Field of Classification Search
CPC ......... B60J 1/2025; B60J 1/2086; B66D 1/26; B66D 1/7405; B66D 1/7447; B66D 1/7489
See application file for complete search history.

(56) References Cited

U.S. PATENT DOCUMENTS

| | | | | |
|---|---|---|---|---|
| 5,551,744 A | * | 9/1996 | Liao ....................... | B60J 1/2019 296/141 |
| 5,915,447 A | * | 6/1999 | Lassen ..................... | E06B 9/60 160/265 |
| 2009/0283731 A1 | * | 11/2009 | Ebbenga .................. | B66D 1/50 254/270 |
| 2011/0127477 A1 | * | 6/2011 | Kokolis ................... | B66D 1/26 254/338 |

(Continued)

FOREIGN PATENT DOCUMENTS

EP    2113419 A1    11/2009

OTHER PUBLICATIONS

German Office Action issued from the German Patent Office in corresponding German Application No. 10 2019 212 097.0 dated Mar. 30, 2020 (5 pages).

*Primary Examiner* — Sang K Kim
*Assistant Examiner* — Nathaniel L Adams
(74) *Attorney, Agent, or Firm* — Flynn Thiel, P.C.

(57) ABSTRACT

A cable drive system having a cable drum housing, a cable drum unit mounted therein for rotation by a drive motor, a first control cable and a second control cable. The first and second control cables are each windably held on the cable drum unit for the purpose of driving the protection device. The first control cable is guided out of a first housing part of the cable drum housing along a first direction, and the second control cable is guided out of a separate, second housing part of the cable drum housing along a second direction. Different mounting positions of the first housing part are provided in which the first housing part is in different rotational positions relative to the second housing part, with the result that the first guidance direction has a different orientation than the second guidance direction in the different mounting positions.

10 Claims, 4 Drawing Sheets

(56) References Cited

U.S. PATENT DOCUMENTS

2012/0048488 A1\* 3/2012 Oh ........................... B60J 1/208
  160/370.22
2012/0048489 A1\* 3/2012 Oh ......................... B60J 1/2025
  160/370.22

\* cited by examiner

CABLE DRIVE SYSTEM FOR A PROTECTION DEVICE FOR A VEHICLE INTERIOR

CROSS-REFERENCE TO RELATED APPLICATIONS

This claims priority from German Application No. 10 2019 212 097.0, filed Aug. 13, 2019, the disclosure of which is hereby incorporated by reference in its entirety.

TECHNICAL FIELD

The invention relates to a cable drive system for a protection device for a vehicle interior, having a cable drum housing, which is arranged in a manner fixed with respect to the vehicle in the state mounted ready for operation, a cable drum unit, which is mounted in the cable drum housing in such a way as to be rotatable around an axis of rotation by means of a drive motor, and having at least one first control cable and one second control cable, wherein the first control cable and the second control cable are each held on the cable drum unit in a manner which allows them to be wound and unwound and are provided for the purpose of driving the protection device, and wherein the first control cable is guided out of the cable drum housing along a first guidance direction, and the second control cable is guided out of said housing along a second guidance direction.

BACKGROUND

A cable drive system of this kind is known from EP 2 113 419 A1 and is provided for the purpose of driving a protection device in the form of a covering device of a motor vehicle interior. The known cable drive system has a cable drum housing, which is arranged in a Manner fixed with respect to the vehicle in the state mounted ready for operation. A cable drum unit is mounted in the cable drum housing in such a way as to be rotatable around an axis of rotation by means of a drive motor. Two separate control cables are fixed on the cable drum unit in a manner which allows them to be wound and unwound. The two control cables are provided for the purpose of moving a covering structure of the covering device between different movement positions. For this purpose, the two control cables are each operatively connected by mechanical means to a driver associated with the covering structure, wherein the drivers are guided in a guide rail arrangement fixed with respect to the vehicle. For attachment to the drivers associated with the covering structure, the control cables are guided out of the cable drum housing along different guidance directions. The guidance directions of the two control cables and the configuration in this respect of the cable drum housing are specifically adapted to the conditions of installation in the vehicle.

SUMMARY

It is the object of the invention to provide a cable drive system of the type stated at the outset which allows a simplified construction and simple adaptation to conditions of installation in the vehicle.

This object is achieved by virtue of the fact that the first control cable is guided out of a first housing part of the cable drum housing, and the second control cable is guided out of a separate, second housing part of the cable drum housing, wherein different mounting positions at least of the first housing part are provided, in which the first housing part is in different rotational positions relative to the second housing part with respect to a reference axis R, with the result that the first guidance direction has a different orientation relative to the second guidance direction in the different mounting positions. By means of the solution according to the invention, it is possible, in particular, to dispense with cable drum housings having different specifications in order to adapt the cable drive system to different conditions of installation in the vehicle. For this purpose, according to the invention the first control cable is guided out of the first housing part and the second control cable is guided out of the separate, second housing part along the respective guidance directions. As a further feature according to the invention, different mounting positions at least of the first housing part are provided. In the different mounting positions, the cable drum housing is in each case joined together ready for operation, wherein the first housing part is in different rotational positions with respect to the reference axis and is thus aligned differently relative to the second housing part. By means of the solution according to the invention, the orientation of the first guidance direction relative to the second guidance direction can thus be adapted by simple means and, in particular, without specific design adaptation of the cable drum housing. If the cable drive system is provided for a protection device in the form of a shading device for a side window of the vehicle interior, the cable drive system can equally well be used for the conditions of installation in the region of the left-hand and the right-hand side window. This generally requires adaptation of the guidance directions of the control cables. According to the invention, this adaptation can be accomplished in a simple manner by appropriate mounting of the first housing part in relation to the second housing part. The cable drum housing is of multi-part configuration and has at least the first housing part and the second housing part. If the cable drive system has three, four or more control cables, for example, the cable drum housing can have a corresponding number of housing parts, which can each be mounted in different mounting positions relative to one another in order to adapt the respective guidance direction of the associated control cable. In the different mounting positions, the first housing part and the second housing part are joined together indirectly or directly, preferably detachably. The cable drum unit preferably has a number of separate cable drums corresponding to the number of control cables, wherein the control cables are each held on one of the cable drums in a manner which allows them to be wound and unwound. As an alternative, the cable drum unit can have a single cable drum with a number of sections corresponding to the number of control cables, wherein the control cables are each held on one of the sections in a manner which allows them to be wound and unwound. The control cables are preferably each in the form of a circulating control cable with two control cable sections in each case. As an alternative, the control cables can each be of single-section design. The guidance directions each preferably extend radially with respect to the reference axis. Depending on the different rotational positioning of the first housing part in the different mounting positions, a different angle can be achieved between the first guidance direction and the second guidance direction. The housing parts are spaced apart axially with respect to the reference axis, preferably being arranged directly adjacent to one another. The reference axis is preferably oriented coaxially with the axis of rotation of the cable drum unit. The control cables are preferably each guided out of a control cable outlet of the respective housing part along the respective guidance direction of said cables. In particular, the control cable outlets can each be in the form of at least one passage, a hole, a recess or the like. A control cable outlet of the first housing part is oriented differently relative to a control cable outlet of the second housing part in the different mounting positions.

As a refinement of the invention, a joint associated with the first housing part is provided with at least one fastening element, wherein the first housing part is secured optionally in the different mounting positions on the second housing part and/or on a further housing part of the cable drum housing by means of the joint. The joint is used to secure the first housing part in the different mounting positions. In particular, the joint can be in the form of a latching, snap or screwed joint. Accordingly, the at least one fastening element can be, in particular, a latching, snap or screw-action element. The joint is preferably configured as a releasable joint. Since the joint allows fastening of the first housing part in the different mounting positions, it is possible to dispense with special joints that are in each case only effective in one of the different mounting positions. An even more simplified construction of the cable drive system is thereby achieved.

As a further refinement of the invention, the joint is a screwed joint of rotationally symmetrical configuration with respect to the reference axis. The screwed joint preferably has a number of screw-action elements matching the number of different mounting positions, said elements being arranged at a uniform angular offset in the circumferential direction relative to one another with respect to the reference axis. If, for example, two different mounting positions are provided, it is advantageous if two screw-action elements arranged offset by 180° relative to one another are provided. In the case of three different mounting positions, three screw-action elements arranged offset by in each case 120° relative to one another are preferably provided. In corresponding fashion, four screw-action elements arranged offset by in each case 90° relative to one another can be provided in the case of four different mounting positions. This refinement of the invention allows an even more simplified construction of the cable drive system with, at the same time, particularly simple adaptability of the guidance directions to the specific conditions of installation in the vehicle.

As a further refinement of the invention, the first housing part has at least one positioning portion, which interacts in positive engagement with different complementary mating positioning portions of the second housing part and/or of a further housing part of the cable drum housing in the different mounting positions. The at least one positioning portion and the different complementary mating positioning portions are used for simplified and accurately fitting positioning of the first housing part in the different mounting positions. In particular, the at least one positioning portion can be in the form of a peg, a nose, a pin or the like. Accordingly, it is possible, in particular, for the complementary mating positioning portions each to be in the form of a peg receptacle, a recess, a hole or the like. The mating positioning portions are of identical configuration. Depending on the mounting position, the at least one positioning portion interacts with a different one of the mating positioning portions.

As a further refinement of the invention, precisely two different mounting positions are provided, wherein, in a first mounting position, the first guidance direction and the second guidance direction are oriented parallel to one another, and wherein, in a second mounting position, the first guidance direction and the second guidance direction are offset by 180° around the reference axis and are thus oriented antiparallel relative to one another. It has been found that, by virtue of this refinement of the invention, it is possible to achieve sufficient adaptability of the guidance directions for a multiplicity of different conditions of installation in the vehicle. In the first mounting position, the two guidance directions are parallel and preferably axially offset with respect to the reference axis. In the second mounting position, the two guidance directions are parallel but opposite to one another and thus antiparallel. The guidance directions preferably each extend radially with respect to the reference axis, both in the first mounting position and in the second mounting position.

As a further refinement of the invention, the first housing part is in the form of a housing cover, and/or the second housing part is in the form of a housing main body. An even more simplified construction of the cable drum housing and hence also of the cable drive system is thereby achieved. In the different mounting positions, the housing cover closes an opening in the end face of the housing main body. The housing cover preferably has a bearing element for the rotatable mounting of the cable drum unit around the axis of rotation.

As a further refinement of the invention, the first housing part and the second housing part delimit a receiving space, in which the cable drum unit is accommodated, in the different mounting positions. The cable drum unit is preferably accommodated in the receiving space in a manner isolated from external influences and, to this extent, is substantially, preferably completely, protected from liquid and/or dust.

As a further refinement of the invention, the cable drum unit has at least two cable drums which are joined together coaxially for torque transmission, wherein a first cable drum is accommodated in the first housing part, and a second cable drum is accommodated in the second housing part. The first control cable is held on the first cable drum in a manner which allows it to be wound and unwound. The second control cable is held on the second cable drum in a manner which allows it to be wound and unwound. The cable drums are arranged spaced apart in the axial direction with respect to the axis of rotation of the cable drum unit. In this case, the first cable drum is accommodated in the first housing part. The second cable drum is accommodated in the second housing part. Accordingly, the first housing part and the second housing part are arranged spaced apart from one another in the axial direction with respect to the axis of rotation. A modular and thus particularly simple construction of the cable drum housing is thereby made possible.

As a further refinement of the invention, the second housing part has a flanged portion, which is provided for connection to a mating flanged portion of the drive motor and/or of a transmission associated with the drive motor. In the state mounted ready for operation, the cable drum housing is thus flanged directly to the drive motor or the associated transmission. An even more simplified construction of the cable drive system is thereby achieved. An output shaft of the drive motor and/or of the transmission is preferably oriented coaxially with respect to the axis of rotation of the cable drum unit and/or the reference axis.

The invention furthermore relates to a protection device, in particular a shading device, for a motor vehicle interior having a cable drive system in accordance with the above description.

BRIEF DESCRIPTION OF THE DRAWINGS

Further advantages and features of the invention will become apparent from the claims and from the following description of a preferred exemplary embodiment of the invention, which is illustrated by means of the drawings.

DETAILED DESCRIPTION

Figure 1:
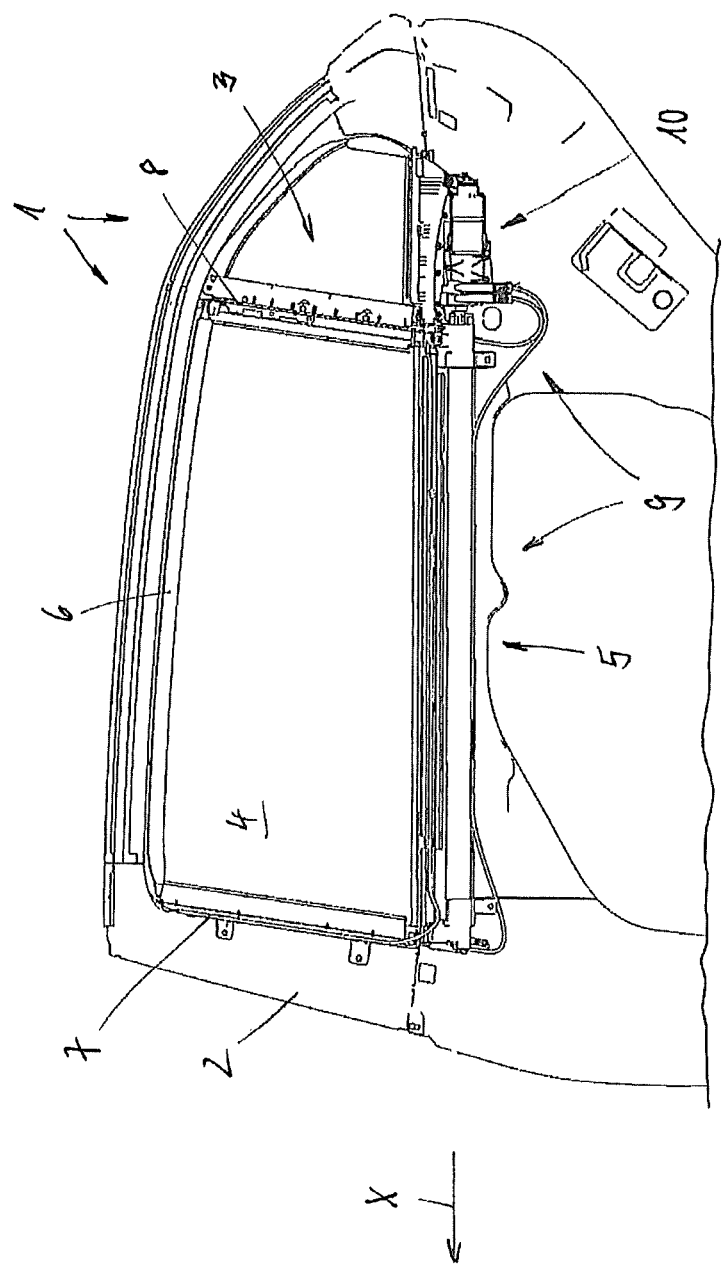
FIG. 1 shows, in a partially cutaway schematic side view, a side door of a passenger car having one embodiment of a protection device according to the invention in the form of a shading device for shading a side window of the side door, wherein the shading device has one embodiment of a cable drive system according to the invention.

According to FIG. 1, a protection device in the form of a shading device 1 is arranged in the region of a side door 2 of a motor vehicle (which is not otherwise shown specifically) and is provided for shading a side window 3. The shading device 1 has a flexible sheet-like structure 4, which is held at one end on a winding shaft 5 in a manner which allows it to be wound and unwound. The winding shaft 5 is arranged in a fundamentally known manner below a sill of the side window 3 and extends approximately parallel to a vehicle longitudinal direction X. In an end face region remote from the winding shaft 5, the flexible sheet-like structure 4 is secured in a fundamentally known manner on a pull-out profile 6. The pull-out profile 6 is guided along a pull-out direction on a guide rail arrangement 7, 8 fixed with respect to the vehicle. In relation to the plane of the drawing in FIG. 1, the guide rail arrangement 7, 8 has a left-hand guide rail 7 and a right-hand guide rail 8, which are arranged fixed with respect to the vehicle in a fundamentally known manner in side regions of the side window 3 which are mutually opposite in the vehicle longitudinal direction X. In mutually opposite end face regions, the pull-out profile 6 has driver elements (not shown specifically), which are provided with sliding guidance in the guide rail arrangement 7, 8 in a fundamentally known manner. The flexible sheet-like structure 4 can be moved along the guide rail arrangement 7, 8 between a shading position (FIG. 1), in which it shades the side window 3, and an exposure position (not illustrated specifically) by means of a movement of the pull-out profile 6. In the exposure position, the pull-out profile 6 has been moved downwards in the direction of the winding shaft 5, with the result that the side window 3 is exposed.

For the driven movement of the pull-out profile 6, the shading device 1 has a cable drive system 9. The cable drive system 9 has a cable drum housing 10, which, in the embodiment shown, is arranged in a manner fixed with respect to the vehicle in the region of the sill and behind the winding shaft 5 in relation to the vehicle longitudinal direction X in the state mounted ready for operation. Further details of the cable drive system 9 are shown, in particular, by means of FIGS. 4 and 5.

There, it can be seen that the cable drive system 9 has a cable drum unit 11. The cable drum unit 11 is mounted in the cable drum housing 10 in a manner which allows it to be rotated about an axis of rotation D by means of a drive motor 12. Furthermore, the cable drive system 9 has a first control cable 13 and a second control cable 14. Both the first control cable 13 and the second control cable 14 are each held on the cable drum unit 11 in a fundamentally known manner in such a way that they can be wound and unwound.

In the present case, both control cables 13, 14 are configured as circulating control cables. Thus, the first control cable 13 has a first control cable section 15 and a second control cable section 16. In a corresponding manner, the second control cable 14 has a third control cable section 17 and a fourth control cable section 18. It is self-evident that the two control cables 13, 14 are illustrated in a cutaway form in FIGS. 2, 3 and 4.

In the case of an embodiment which is not shown, a configuration which has just a single section can be provided instead of a circulating configuration of the control cables.

The first control cable 13 and the second control cable 14 are each operatively connected in a fundamentally known manner by mechanical means to said driver elements of the pull-out profile 6. In this way, the pull-out profile 6 can be moved along the guide rail arrangement 7, 8, being driven by means of a winding and/or unwinding movement of the control cables 13, 14. During this process, the first control cable 13 and the second control cable 14 are each guided in a flexible tubular guide (not designated specifically), starting from the region of the cable drum housing 10.

Figure 2:
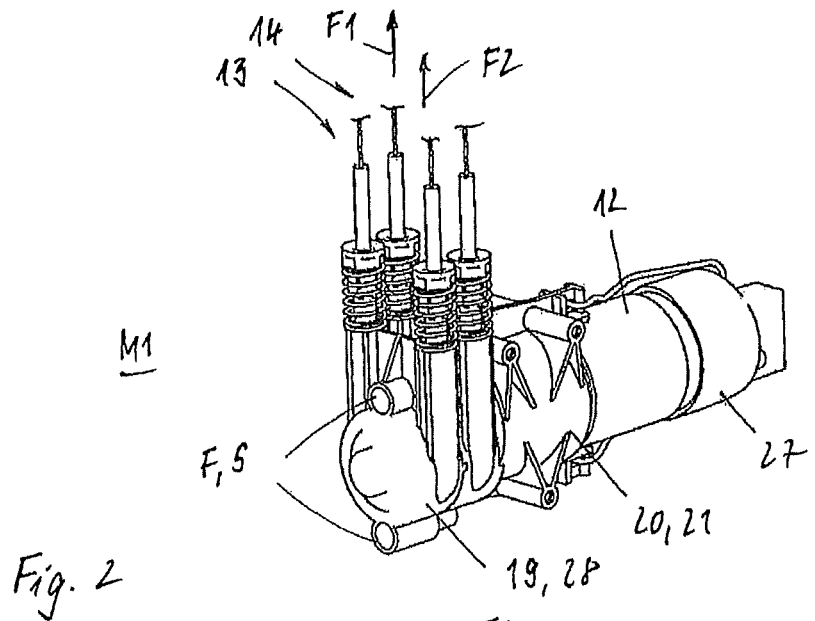
FIG. 2 shows, in a schematic perspective view, the cable drive system according to FIG. 1 in the region of a cable drum housing having a first housing part and a second housing part, wherein the first housing part is occupying a first mounting position ready for operation.
Figure 3:
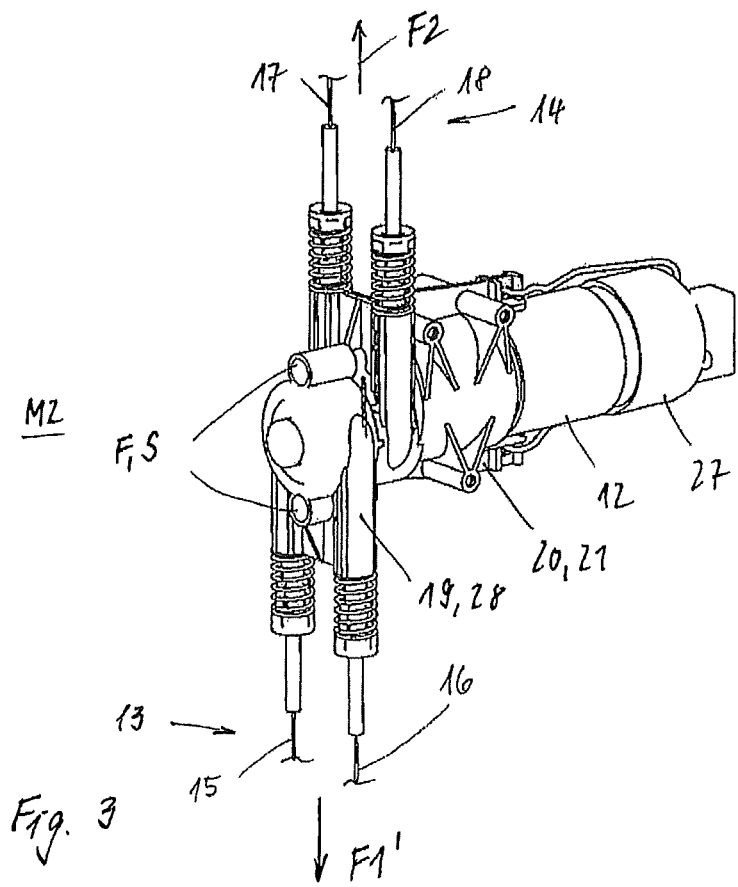
FIG. 3 shows the cable drive system in a view corresponding to FIG. 2, wherein the first housing part is occupying a second mounting position ready for operation.

For attachment to the driver elements of the pull-out profile 6, the two control cables 13, 14 are guided out of the cable drum housing 10 in a manner that will be described in greater detail below. In the installed state that can be seen by reference to FIG. 1, the first control cable 13 is guided out of the cable drum housing 10 along a first guidance direction F1, and the second control cable is guided out of said housing along a second guidance direction F2. This is also shown by means of the enlarged illustration in FIG. 2, wherein the cable drive system 9 in the view shown there has been rotated by approximately 180° around its longitudinal axis in comparison with FIG. 1. Accordingly, the guidance directions F1, F2 shown by means of FIG. 2 are aligned in opposite directions in comparison with the orientation shown by means of FIG. 1 for graphical reasons.

Depending on whether the control cable system 9 is installed in the region of the right-hand side door 2 shown by means of FIG. 1 or in the region of a left-hand side door (not shown), for example, different routing of the control cables 13, 14 may be necessary for attachment to the driver elements. In particular, this can require that the control cables 13, 14 are guided out of the cable drum housing 10 in a manner adapted to the changed installation conditions.

In order to be able to dispense with specific design adaptation of the cable drum housing 10 to the given installation conditions, the first control cable 13 is guided out of a first housing part 19 of the cable drum housing 10, and the second control cable 14 is guided out of a separate, second housing part 20 of the cable drum housing, wherein different mounting positions M1, M2 (FIGS. 2, 3) at least of the first housing part 19 are provided, in which the first housing part 19 is in different rotational positions relative to the second housing part 20 with respect to a reference axis R (FIG. 4), with the result that the first guidance direction F1 has a different orientation relative to the second guidance direction F2 in the different mounting positions M1, M2.

In the embodiment shown, precisely two different mounting positions M1, M2 are provided, although this is not compulsory. In an embodiment that is not shown, it is also possible for three, four or more different mounting positions to be provided.

In the first mounting position M1 of the first housing part 19, said position being shown by means of FIG. 2, the first guidance direction F1 and the second guidance direction F2 extend parallel to one another. In a second mounting position M2 of the first housing part 19, said position being shown by means of FIG. 3, a first guidance direction F1' which differs from that in the first mounting position M1 is obtained. In relation to the plane of the drawing in FIG. 3, the first guidance direction F1' is directed downwards and oriented offset by about 180° around the reference axis R with respect to the second guidance direction F2. Instead of a parallel extent, an antiparallel extent of the first guidance direction F1' and of the second guidance direction F2 is thus obtained. Depending on the conditions for the installation of the cable drive system 9 on the vehicle, the first housing part 19 can be positioned and secured either in the first mounting position M1 or the second mounting position M2.

Figure 4:
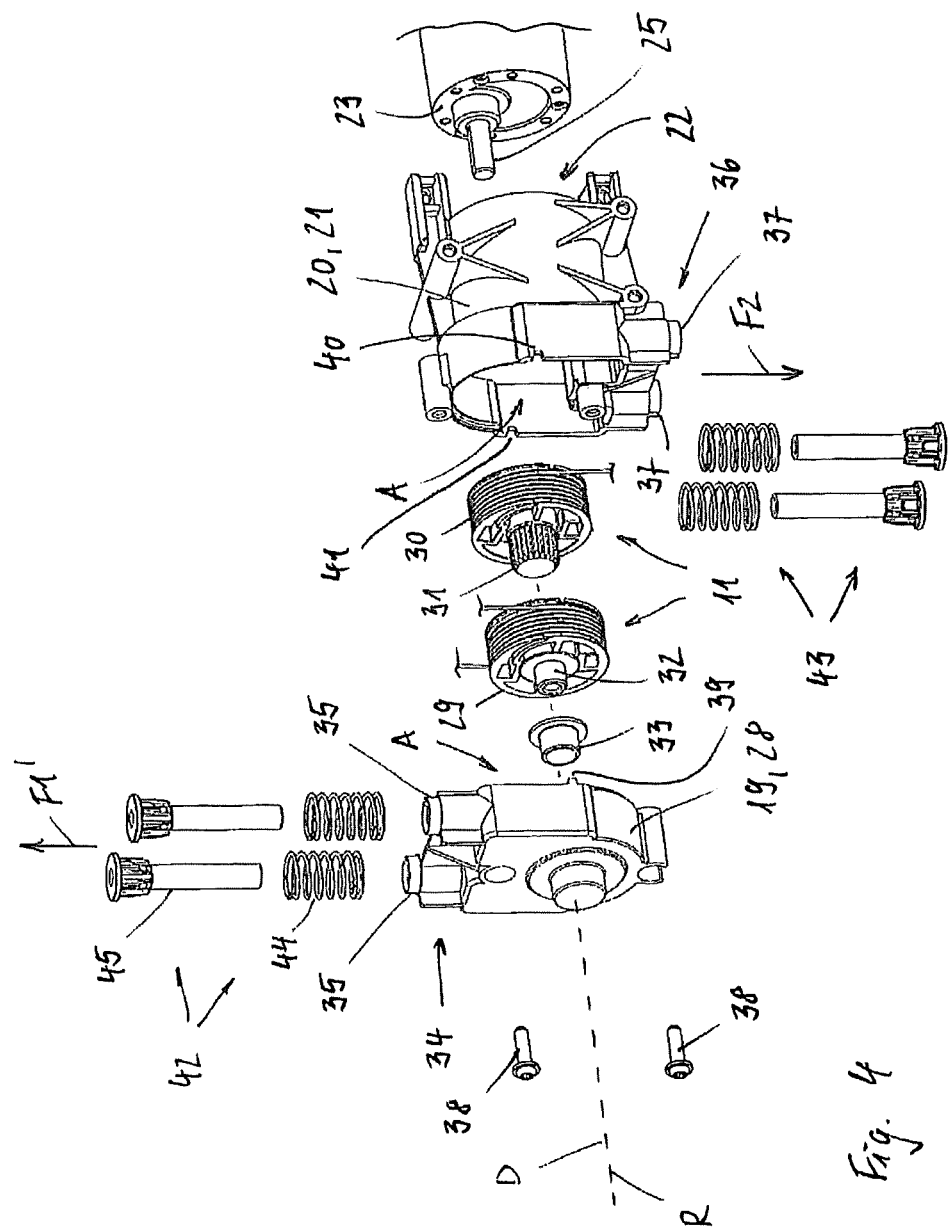
FIG. 4 shows, in a partially cutaway perspective exploded illustration, a first region of the cable drive system.
Figure 5:
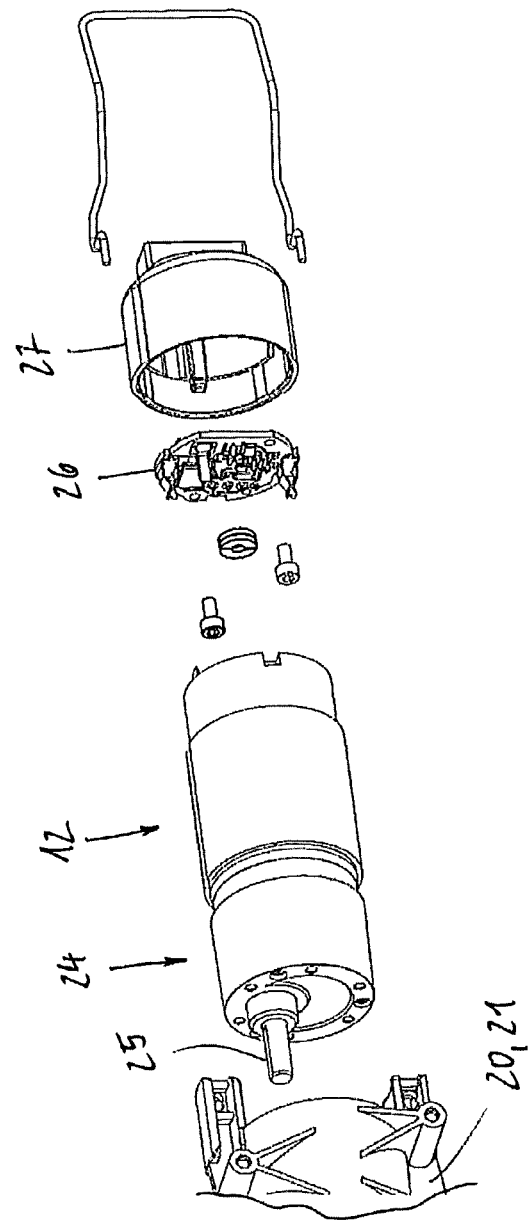
FIG. 5 shows, in a view corresponding to FIG. 4, a further region of the cable drive system, said region adjoining the region shown in FIG. 4 in the axial direction.

The specific configuration of the embodiment shown is explored below with particular reference to FIGS. 4 and 5. The design features and functional features disclosed in this context should not be considered to be compulsory, however. Moreover, attention is drawn to the fact that the illustrations in FIGS. 4 and 5 have been rotated by 180° around the longitudinal axis in comparison with FIGS. 2 and 3.

In the present case, the second housing part 20 is in the form of a housing main body 21. The housing main body 21 has a flanged portion 22 (not visible in detail), which is provided for connection to a mating flanged portion 23. The mating flanged portion 23 is arranged on a transmission 24 associated with the drive motor 12. The drive motor 12 and the transmission 24 are operatively connected by mechanical means in a fundamentally known manner, thus enabling an output speed of the drive motor 12 to be converted by means of the transmission 24 into a transmission speed available on a transmission output shaft 25. As is shown by means of FIG. 5, the drive motor 12 is furthermore assigned a contact device 26, which is arranged on an end face region of the drive motor 12 facing away from the transmission 24 and is provided for the electrical contacting of the drive motor 12. In the state mounted ready for operation, the contact device 26 is hidden below a cover element 27.

The transmission output shaft 25 projects in an axial direction through a through opening (not shown specifically) in the housing main body 21 and is connected in a fundamentally known manner to the cable drum unit 11 for torque transmission. The cable drum unit 11 is accommodated in a receiving space A bounded by the first housing part 19 and the second housing part 20. In the present case, the first housing part 19 is in the form of a housing cover 28. In the different mounting positions M1, M2, the housing cover 28 closes the housing main body 21, with the result that the cable drum unit 11 is accommodated in the cable drum housing 10 in a manner substantially, preferably completely, protected from moisture and/or dust and is thus isolated.

In the present case, the cable drum unit 11 has a first cable drum 29 and a second cable drum 30. The first cable drum 29 is associated with the first control cable 13. The second cable drum 30 is associated with the second control cable 14. The cable drums 29, 30 are coaxial with one another and oriented coaxially with respect to the axis of rotation D. The second cable drum 30 has a shaft extension 31, which is fitted into a receiving bush (not designated specifically) of the first cable drum 29 in an axial direction and is joined to said drum for torque transmission by means of a splined interface (not designated specifically). In its end face region facing away from the shaft extension 31 in an axial direction, the second cable drum 30 is fitted to the transmission output shaft 25 for torque transmission. The first cable drum 29 has a circular-cylindrical bearing surface 32, which is fitted into a bearing bush 33 in an axial direction and is guided in the latter in a manner which allows a sliding movement around the axis of rotation D. The bearing bush 33 is fitted in a manner not shown into the first housing part 19 or housing cover 28.

In the assembled state of the housing parts 19, 20, the first cable drum 29 is accommodated in the first housing part 19 or housing cover 28. The second cable drum 30 is accommodated in the second housing part 20 or housing main body 21.

For the exit of the first control cable 13 from the first housing part 19, said housing part has a control cable outlet 34. The cable outlet 34 has two tubular guide portions 35. In this arrangement, the first control cable section 15 and the second control cable section 16 of the first control cable 13 are guided out of the first housing part 19 along the first guidance direction F1 by the guide portions 35.

For the exit of the second control cable 14 from the second housing part 20, said housing part has a control cable outlet 36. The control cable outlet 36 has two tubular guide portions 37. The third control cable section 17 and the fourth control cable section 18 of the second control cable 14 are guided out of the first housing part 20 or housing main body 21 along the second guidance direction F2 by the guide portions 37.

The control cable outlets 34, 36 have different orientations with respect to one another, depending on the different mounting positions M1, M2.

The first housing part 19 is joined to the second housing part 20 by means of one and the same joint F, both in the first mounting position M1 and in the second mounting position M2. In the present case, the joint F is a screwed joint S which is rotationally symmetrical with respect to the reference axis R. The screwed joint S comprises two screws 38, which are arranged offset by 180° relative to one another with respect to the reference axis R. By virtue of the resulting rotationally symmetrical configuration of the screwed joint S, the first housing part 19 can be secured easily on the second housing part 20, both in the first mounting position M1 and in the second mounting position M2. To receive the screws 38, the first housing part 19 has through openings (not designated specifically). The second housing part 20 has two threaded holes arranged offset by 180° relative to one another with respect to the reference axis R.

Moreover, the first housing part 19 has at least one positioning portion 39. In the present case, the positioning portion 39 is in the form of a peg. The second housing part 20 has a first mating positioning portion 40 and a second mating positioning portion 41. The mating positioning portions 40, 41 are each configured in a manner complementary to the positioning portion 39. Accordingly, the first mating positioning portion forms a first peg receptacle 40, and the second mating positioning portion forms a second peg receptacle 41. Depending on whether the first housing part 19 occupies the first mounting position M1 or the second mounting position M2, the positioning portion 39 interacts in positive engagement either with the first mating positioning portion 40 or the second mating positioning portion 41.

Moreover, a first tensioning device 42 is associated with the first housing part 19, and a second tensioning device 43 is associated with the second housing part 20. The control cables 13, 14 can be pretensioned in a fundamentally known manner by means of the tensioning devices 42, 43. The tensioning devices 42, 43 are of identical construction and to this extent have identical component elements. In this arrangement, each of the tubular guide portions 35 and 37 is assigned a compression spring 44 and a sleeve 45. The compression springs 44 and the sleeves 45 are aligned coaxially with one another in pairs, wherein the sleeves 45 extend axially into the guide portions 35 and 37, respectively.

The invention claimed is:

1. A cable drive system for a protection device for a vehicle interior, the cable drive system comprising a cable drum housing arranged in a manner fixed with respect to the vehicle in a mounted state ready for operation, a cable drum unit mounted in the cable drum housing in such a way as to be rotatable around an axis of rotation by a drive motor, and at least one first control cable and one second control cable, wherein the first control cable and the second control cable are each held on the cable drum unit in a manner which allows the first control cable and the second control cable to be wound and unwound, the first control cable and the second control cable being provided for the purpose of driving the protection device, wherein the first control cable is guided out of the cable drum housing along a first guidance direction and the second control cable is guided out of the housing along a second guidance direction, wherein the first control cable is guided out of a first housing part of the cable drum housing and the second control cable is guided out of a separate, second housing part of the cable drum housing, wherein different mounting positions at least of the first housing part are provided, in which different mounting positions the first housing part is in different rotational positions relative to the second housing part with respect to a reference axis, with the result that the first guidance direction has a different orientation relative to the second guidance direction in the different mounting positions.

2. The cable drive system according to claim 1, wherein a joint associated with the first housing part is provided with at least one fastening element, and the first housing part is secured in the different mounting positions on the second housing part and/or on a further housing part of the cable drum housing by the joint.

3. The cable drive system according to claim 2, wherein the joint is a screwed joint of rotationally symmetrical configuration with respect to the reference axis.

4. The cable drive system according to claim 1, wherein the first housing part has at least one positioning portion interacting in positive engagement with different complementary mating positioning portions of the second housing part and/or of a further housing part of the cable drum housing in the different mounting positions.

5. The cable drive system according to claim 1, wherein the different mounting positions include two different mounting positions, wherein in a first one of the two different mounting positions the first guidance direction and the second guidance direction are oriented parallel to one another, and/or wherein in a second one of the two different mounting positions the first guidance direction and the second guidance direction are offset by 180° around the reference axis and are thus oriented antiparallel relative to one another.

6. The cable drive system according to claim 1, wherein the first housing part is in the form of a housing cover, and/or the second housing part is in the form of a housing main body.

7. The cable drive system according to claim 1, wherein the first housing part and the second housing part delimit a receiving space, the cable drum unit being accommodated in the receiving space in the different mounting positions.

8. The cable drive system according to claim 1, wherein the cable drum unit has at least two cable drums which are joined together coaxially for torque transmission, wherein a first cable drum of the at least two cable drums is accommodated in the first housing part, and a second cable drum of the at least two cable drums is accommodated in the second housing part.

9. The cable drive system according to claim 1, wherein the second housing part has a flanged portion provided for connection to a mating flanged portion of the drive motor and/or of a transmission associated with the drive motor.

10. A protection device for a motor vehicle interior, including a cable drive system according to claim 1.

* * * * *